(12) United States Patent
McAllister et al.

(10) Patent No.: US 7,012,892 B1
(45) Date of Patent: Mar. 14, 2006

(54) METHOD AND APPARATUS FOR SUPPORTING CONNECTION TYPE PARTITIONING IN A COMMUNICATIONS NETWORK

(75) Inventors: Shawn P. McAllister, Manotick (CA); Andrew Dolganow, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/293,297

(22) Filed: Apr. 16, 1999

(51) Int. Cl.
   *H04L 12/24* (2006.01)
(52) U.S. Cl. ............. 370/231; 370/252; 370/409
(58) Field of Classification Search ............. 370/229, 370/230, 231–235, 237, 238, 254, 389, 392, 370/395.2, 395.21, 395.42, 395.43, 395.3, 370/400, 401, 468, 230.1, 252, 409, 477
See application file for complete search history.

(56) References Cited

U.S. PATENT DOCUMENTS

| | | | | |
|---|---|---|---|---|
| 5,491,690 A | * | 2/1996 | Alfonsi et al. | 370/60 |
| 5,629,930 A | * | 5/1997 | Beshai et al. | 370/396 |
| 5,687,167 A | * | 11/1997 | Bertin et al. | 370/254 |
| 5,777,986 A | * | 7/1998 | Grossman | 370/235 |
| 5,894,471 A | * | 4/1999 | Miyagi et al. | 370/230 |
| 6,026,077 A | * | 2/2000 | Iwata | 370/254 |
| 6,188,671 B1 | * | 2/2001 | Chase et al. | 370/232 |
| 6,317,438 B1 | * | 11/2001 | Trebes, Jr. | 370/466 |
| 6,446,079 B1 | * | 9/2002 | Tooker et al. | 707/104 |

* cited by examiner

*Primary Examiner*—Ricky Ngo
*Assistant Examiner*—Duc Duong (57) ABSTRACT

A method and apparatus for communicating and utilizing link connection type characteristics in a communications network begins by determining the connection type characteristics for a link within the network. The connection type characteristics preferably include the partitioning of the available bandwidth of the link. The connection type characteristics for the link are advertised to at least one node in the network. The connection type characteristics are then used to perform network functions such as selecting routing paths for new connections. When a change occurs in the link that results in altered connection type characteristics for the link, the altered connection type characteristics are determined and advertised in a similar manner.

52 Claims, 4 Drawing Sheets

METHOD AND APPARATUS FOR SUPPORTING CONNECTION TYPE PARTITIONING IN A COMMUNICATIONS NETWORK

TECHNICAL FIELD OF THE OF INVENTION

The invention relates generally to communication systems and more particularly to supporting connection type partitioning in communication networks.

BACKGROUND OF THE INVENTION

Communication between a calling party and a called party may be established over a communications network. Different types of connections, or calls, can exist in some communication networks. These different types of connections include permanent-type connections that generally ensure a calling party immediate communication access to the called party since the connection is permanently established, and switched-type connections, where the calling party attempting to reach the called party has no guarantee that a connection will be established. Servicing different types of connections allows for a communication system to support the needs of a variety of users. Although individual networks dedicated to switched and permanent type connections can be established to support each type of user, it is much more economical and efficient to establish a single network that can support the needs of a variety of users.

A typical communication system includes a plurality of switches that pass data in packets or cells from a calling party to the called party and vice versa. The links coupling the switches may have different data carrying capabilities such that the bandwidth available for data communication across each link may vary greatly.

One technique that has been used to facilitate overall network efficiency and to isolate the impact of one service (eg. SVCs) on another (eg. SPVCs) has been to partition the bandwidth on individual links among the types of service. Partitioning can be used to ensure a certain amount of bandwidth across a link is used for permanent type connections, whereas another portion is used for switched type connections. In other embodiments, partitioning can be used to separate the total bandwidth across a link between customers, such as in a virtual private network (VPN) application, or to divide the available bandwidth based on a prioritization scheme. The "connection type" of a connection is used throughout the application to distinguish between the different types of users, priorities, or services (eg. SVC vs. SPVC) corresponding to connections that utilize the various bandwidth partitions.

Although partitioning bandwidth across a link can ensure that the bandwidth is reserved for a certain connection type, current call routing systems are not equipped to use information regarding partitioning in a network to make more intelligent routing decisions. For example, if a path or group of links has a large amount of available bandwidth, but it is partitioned such that none of the bandwidth is available for routing a certain connection type, the routing system may still try to route a call of that connection type using the path. In some cases, the routing system may try a number of inappropriate paths before it blindly stumbles upon a path whose partitioning supports the particular connection type. This inefficient routing reduces some of the benefits gained from link partitioning and degrades overall network performance.

Therefore, a need exists for a method and apparatus that uses partitioning information to make intelligent path selection routing and other network decisions. The method and apparatus should be capable of supporting the variety of different types of partitioning that can exist, including connection type partitioning, user partitioning, and partitioning based on various prioritization schemes.

DETAILED DESCRIPTION OF A PREFERRED EMBODIMENT OF THE INVENTION

Generally, the present invention provides a method and apparatus for communicating and utilizing link connection type characteristics in a communications network. The connection type or other partitioning characteristics for a link within the network are first determined, where the connection type characteristics can include the partitioning of the available bandwidth of the link between switched virtual connections (SVCs) and soft permanent virtual connections (SPVCs). In other embodiments, the partitioning may be based one user partitioning, priority partitioning, or other forms of partitioning bandwidth across links in the network. The connection type or other partitioning characteristics for the link are advertised to at least one node in the network, and are preferably relayed to additional nodes within the network. The relayed characteristics are used to perform network functions such as selecting routing paths for new connections. When a change occurs in the link that results in altered connection type characteristics for the link, the altered connection type characteristics are advertised in a similar manner. By communicating the connection type characteristics within the network, it is possible to route connections in an intelligent manner that avoids attempts to route a connection of a specific connection type through a link that does not support, or have available bandwidth for, that connection type.

Dynamic routing systems in connection oriented networks, such as asynchronous transfer mode (ATM) networks, may establish at least two different types of connections. The first of these two connections is a switched virtual connection (SVC). SVCs are typically originated by users or customers of the network that wish to establish connections on demand. These connections are typically released as soon as the connection is no longer required. SVC customers expect their connections to be established, but they understand that the network may refuse these requests during periods of networking congestion. This potential inability to connect is an understood condition of SVC service, and typically the cost of SVC service reflects this inherent risk.

The second type of connection is a permanent virtual connection (PVC). Customers subscribing to a PVC service expect extremely high uptime for their connection. This expectation is independent of network failures and network congestion, and is understood to be part of the PVC service. Typically, the cost of PVC service reflects this guaranteed level of uptime.

A PVC service is sometimes implemented using soft PVCs (SPVCs) in order to help achieve fast and efficient rerouting in the case of network failures. Soft PVCs are also often referred to as smart PVCs or switched PVCs. SPVCs are typically able to reroute connections around failed equipment in a more timely manner than is possible with other methods. SPVCs also allow operators to make use of dynamic routing protocols to route these connections.

SPVCs and SVCs can be established in a network based on a routing tables constructed to inform the processor doing the routing as to the available bandwidth across the various links in the network. Dynamic routing protocols, such as the Private Network to Network Interface (PNNI) established by the ATM Forum allow for the routing table storing the topology of the network to be utilized to establish connections within the network. PNNI supports the service categories that are available on each of the links within the network, where the service categories in ATM systems may include Constant Bit Rate (CBR), Unspecified Bit Rate (UBR), Available Bit Rate (ABR), and the like. These different service categories are well known in the art.

The routing table preferably stores the available bandwidth for each of the service categories on the links within the network. In order to route a connection through the network using the preferable technique associated with routing SVC connections, a designated transit list (DTL) is generated that is used by all of the transit nodes in the network. Transit nodes include nodes between the originating node and the destination node that transport data packets between the two for a particular connection. Thus, in a call originating at node A that terminates at node D while passing through nodes B and C, nodes B and C are transit nodes.

If the bandwidth across the links in the network is generally shared between SVC and SPVC connections such that either can use as much bandwidth as required, it is possible that a large number of SVC connections will swamp the network at a time when an SPVC connection needs to be routed or rerouted. In this case, the routing options include the possibility of bumping, or terminating, enough of the SVC connections such that bandwidth is made available for the SPVC connection. However, it is known by those of ordinary skill in the art that terminating a large number of SVC connections in this manner can have a cascading effect that causes further degradation in service within the network.

A preferred solution that allows for SVC and SPVC connections to co-exist within the network involves partitioning the available bandwidth on the links in the system between SVC and SPVC connections. While this can ensure that adequate bandwidth is available for routing and rerouting of SPVC connections, prior art routing systems are not capable of generating routing tables based on link utilization that includes this partitioning information. As such, prior art routing systems may understand the available bandwidth on a link, but not whether any of this bandwidth is available for an SPVC connection.

In other networks, partitioning may be based on user identity or a particular prioritization scheme. For example, bandwidth across a link in the network may be divided up between a number of different users, where the data traffic of each user is allocated a certain percentage of the overall bandwidth. This provides the functionality of a virtual private network (VPN), where each user has a guaranteed level of bandwidth across the various links within the network.

In an example of prioritization partitioning, a number of priority levels may be associated with various calls or connections in a network. The bandwidth of the links in the network may be partitioned amongst the priority levels such that connections of higher priority are more likely to be established. In such a system, a connection may utilize bandwidth associated with priorities equal to or less than the priority of the connection. For example, if there are five levels of priority, with level one as the highest and level five the lowest, a level one connection may be established across bandwidth allocated to any priority level. A connection of priority level three could use bandwidth of levels three, four, and five. A level five connection would only be able to utilize bandwidth of priority level five. Note that this ia rather specific example of one type of prioritization scheme, and it should be apparent to one of ordinary skill in the art that a variety of prioritization schemes could be used to partition and allocate bandwidth in a network.

As stated earlier, although partitioning based on a variety of criteria can allow the bandwidth resources of a network to be utilized in a certain manner, prior art routing systems do not have access to or are unable to utilize the partitioning information required to make intelligent routing decisions. The routing system may repeatedly attempt to route connections through links or along paths that have available bandwidth, but that don't have available bandwidth in a partition that corresponds to a particular connection type, priority level, or user associated with the connection trying to be established.

For example, during routing and rerouting of connections, when a network limitation is detected between nodes B and C that prevents a call from being established across the link, node B will detect the problem. As node B is merely a transit node, it will provide this information back to node A, which attempts to establish a new route. However, because PNNI does not support differentiation between connection types (SVC vs. SPVC) or other partitioning schemes along the links within the network, routing can repeatedly attempt to establish a call along a routing path that does not support the connection type required. This results in call blocking. In systems that are capable of routing around such blocking points, alternate routing will occur, but the alternate path may suffer from the same problem. Repeated tries to route a call through links that cannot support the call can prevent the call from being established entirely. Therefore, more information as to the partitioning supported across the links in the system is needed by the nodes performing the routing.

The solution presented herein determines the specific connection-type or other partitioning characteristics across the links within the network and communicates this information to the processors performing the routing of the connections. The level of granularity of the connection type information can be such that the available bandwidth for each connection type in a variety of supported service categories can be provided to the routing systems. Based on this added information, the connection routing processors can intelligently route calls or connections such that the likelihood of a successful connection being established is greatly increased.

Figure 1:
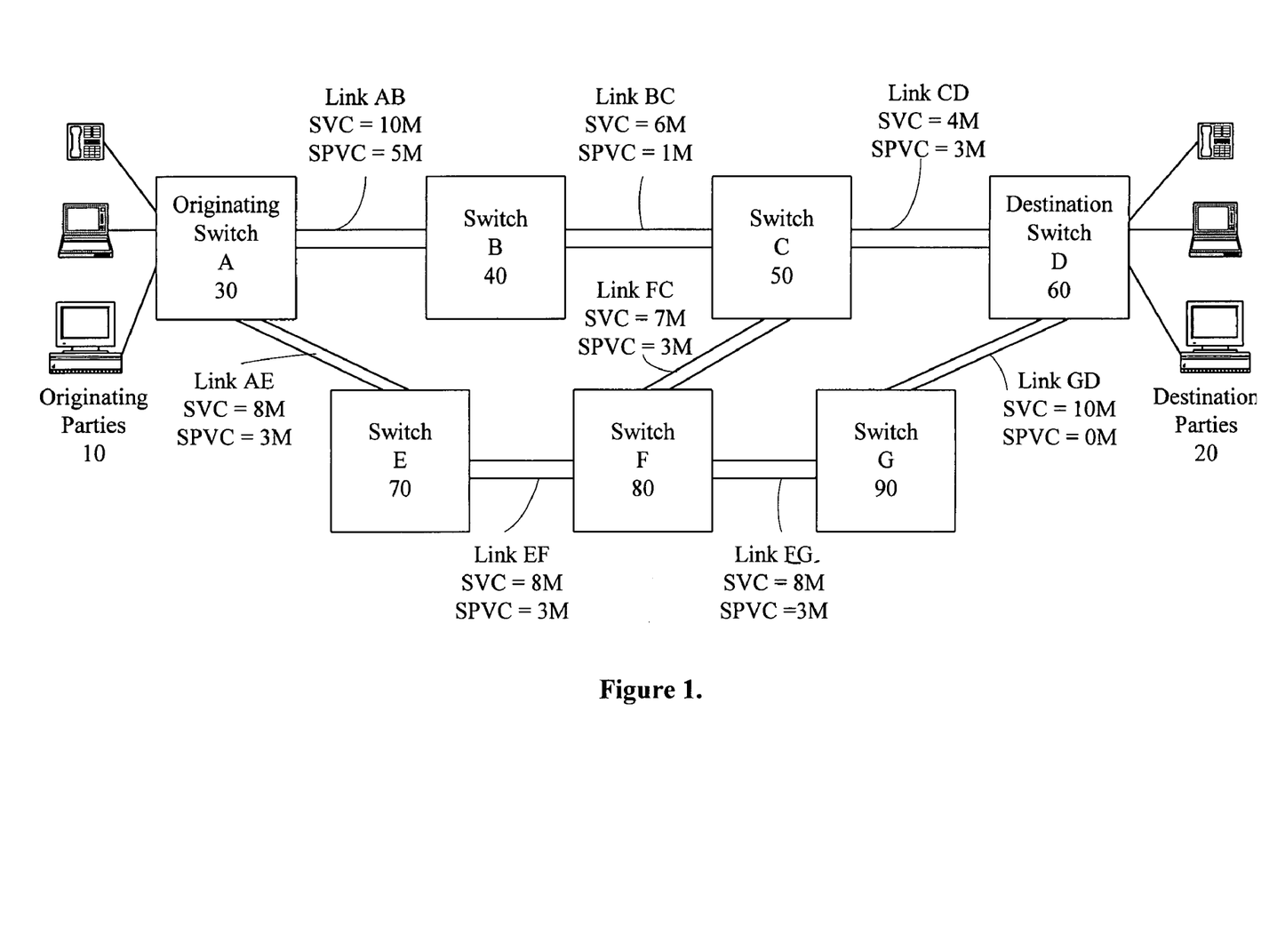
FIG. 1 illustrates a block diagram of a data communications network in accordance with the present invention.

The invention can be better understood with reference to FIGS. 1–5. FIG. 1 illustrates a block diagram of a connection-oriented network. The network may be implemented using various technologies, including, but not limited to, ATM, frame relay, MPLS, and any other connection oriented technology that could support connection type partitioning. The network includes a plurality of switches, including an originating switch A 30 coupled to a number of originating parties 10. Each of the originating parties 10 may be a router, a network coupled to a router, and or an end user device such as a personal computer, facsimile machine, video telephone, and or any device that receives and or transmits data via a communication network. The originating switch A 30 provides the originating parties 10 with access to the communications network such that, through the use of the switches within the communications network, data can be communicated to the destination parties 20. The destination parties 20 may be a variety of different entities similar to the originating parties 10.

Each of the links within the communications network is partitioned to include an amount of bandwidth dedicated to SVC connections and a possibly different amount of bandwidth dedicated to SPVC type connections. Note that the connection type partitioning illustrated is only one type of partitioning that may be included in a network. Priority-based, user-based, or other forms of partitioning could also be used to demonstrate the advantages of the present invention. As illustrated, link AB, which connects the originating switch A 30 to switch B 40 is capable of carrying 10 Megabits/second (M) of SVC traffic, and 5M of SPVC traffic.

In order to make intelligent routing decisions using the switches within the network, the originating switch A 30 preferably includes a table that stores the bandwidth capabilities for each of the links within the network. By including the information describing the partitioning across each of the links, the originating switch A 30 can make more intelligent routing decisions than prior art systems that had to route connections without such information.

For example, assume that the originating switch A 30 wishes to establish a 3M SPVC connection with the destination switch D 60. In prior art routing systems, the total amount of available bandwidth across each link is stored in the routing table, with no differentiation between the partitioned resources. As such, a prior art routing system may attempt to route the connection from switch A 30 through switches B 40 and C 50 to switch D 60. The prior art routing system would know that there is 15M of available bandwidth across link AB, 7M across link BC, and 7M across link CD. Based on this, the 3M SPVC connection is within the known limitations of the path, and the call is attempted. However, the call is blocked at switch B 40, as the link between switches B 40 and C 50 is partitioned such that only 1M of SPVC bandwidth is available.

Once the call is blocked at switch B 40, the originating switch 30 may attempt to route the connection from switch A 30 through switches E 70, F 80, and G 90 to destination switch D 60. However, once again the call will be blocked. Switch G 90 will determine that there is no available bandwidth across link GD for SPVC connections and will relay the fact that the call is blocked back to the originating switch A 30. In some prior art systems, some details regarding the blocking of connections may be stored and heuristics used to route future connections. However, these heuristic prior art systems are often relatively complicated and do not necessarily understand the true reasons why calls are being blocked. As such, they cannot provide the needed level of performance.

In the prior art systems, the originating switch A 30 may after numerous failed attempts eventually determine that the only available path for the 3M SPVC connection is through switches E 70, F 80, and C 50 to the destination switch D 60.

The present invention avoids the blind attempts that can result in call blocking by providing the partitioning information to the routing systems, which are then able to utilize the information to make intelligent routing decisions.

The network illustrated in FIG. 1 is a greatly simplified network. In more complex networks, the information regarding connection type and other forms of partitioning supported across various links becomes more important in ensuring that routing is not attempted across links that cannot support the needs of a specific call. In prior art systems, the same inadequate routes may be tried over and over again without success, as the routing processor has no knowledge of the partitioning of the bandwidth across the link.

Figure 2:
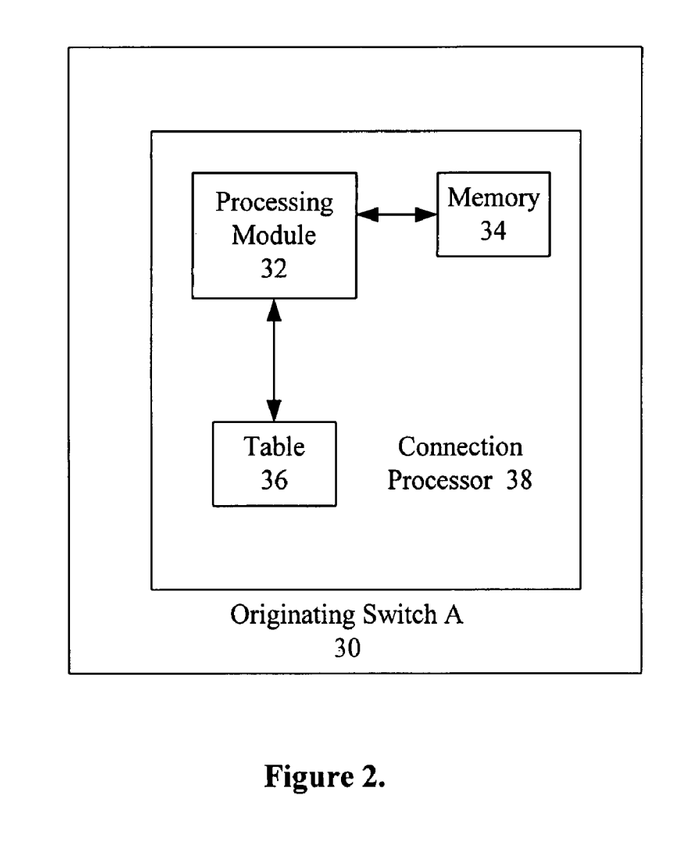
FIG. 2 illustrates a block diagram of a connection processor in accordance with the present invention.

FIG. 2 illustrates a block diagram of an originating switch A 30 that supports storage and use of the additional connection-type or other forms of partitioning information. The originating switch A 30 includes a connection processor 38. The connection processor 38 includes a processing module 32 and memory 34. The processing module 32 may include a single processing entity or a plurality of processing entities. Such a processing entity may be a microprocessor, microcontroller, microcomputer, digital signal processor, central processing unit, state machine, group of logic circuitry, and/or any device that processes information based on operational and/or programming instructions. The memory 34 may be a single memory device or a plurality of memory devices. Such a memory device may be a read only memory device, random access memory device, floppy disk, hard drive memory, CD memory, magnetic tape memory, DVD memory, and/or any device that stores digital information. Note that when the processing module has one or more of its functions performed by a state machine and/or logic circuitry, the memory containing the corresponding operational instructions is embedded within the state machine and/or logic circuitry.

Figure 4:
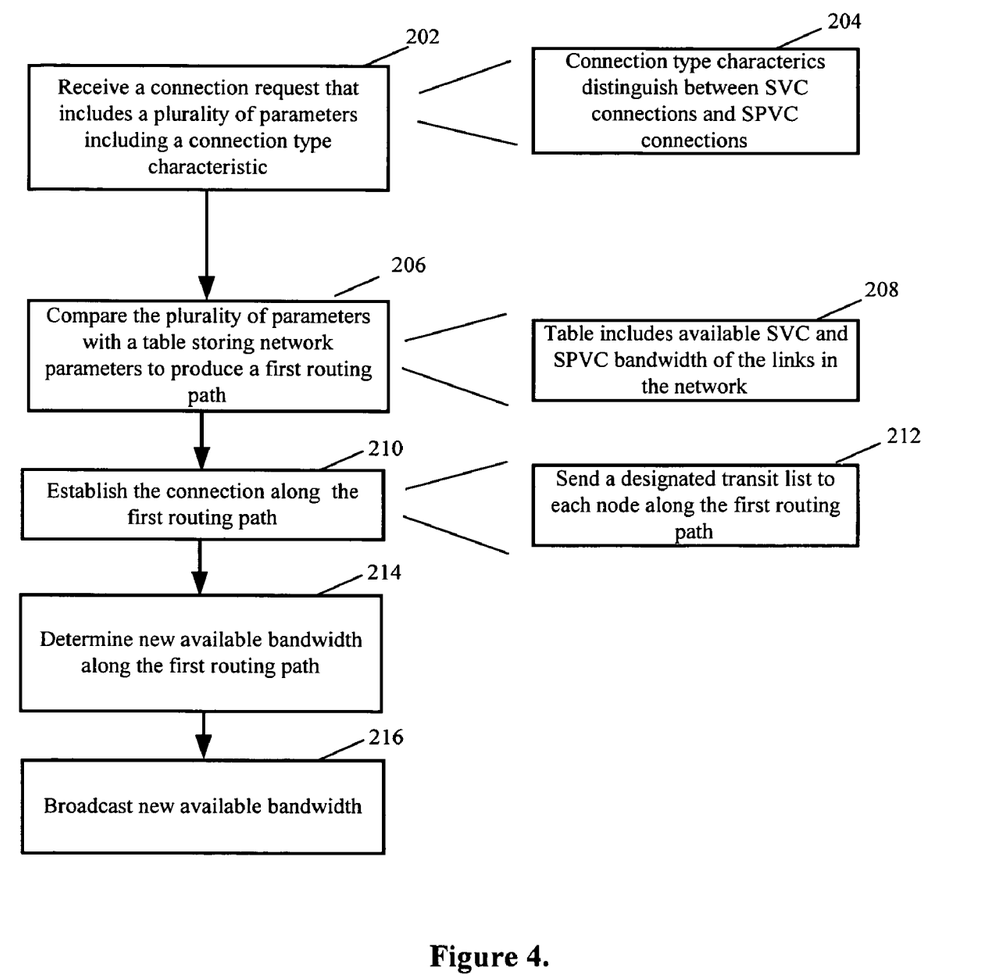
FIG. 4 illustrates a flow diagram of a method for establishing a connection in a communications network in accordance with the present invention.

The memory 34 stores programming and/or operating instructions that, when executed, cause the processing module 32 to perform the method illustrated in FIG. 4. FIG. 4 illustrates a flow diagram of a method for establishing a connection in a communication network that utilizes the knowledge of bandwidth partitioning of links to perform intelligent routing decisions. The process begins at step 202, where a connection request is received. The connection request includes a plurality of parameters, where one of the parameters is a connection type characteristic. Preferably, this connection type characteristic corresponds to bandwidth partitioning that has been performed for the links within the network.

As illustrated in step 204, the connection type characteristic preferably distinguishes between SVC connections and SPVC connections. In other embodiments, the connection type characteristic may distinguish between different customer types, application types, or other forms of connection prioritization schemes as discussed earlier. Similarly, the number of connection types that may be supported may be greater than the preferable set that includes SVCs and SPVCs.

At step 206, the processing module 32 compares the plurality of parameters of the connection request with information stored in the table 36 to determine or select a first routing path. The table 36 stores network parameters that include the connection type characteristics corresponding to each of the links within the network. Preferably, the parameters supported by current PNNI version 1.0 are included in the table along with the connection-type characteristics, which are not included in PNNI version 1.0. As stated earlier, connection type characteristics include partitioning information corresponding to the various links in the network. As illustrated in step 208, the table preferably includes the available SVC and SPVC bandwidth across each of the links within the network.

The determination or selection of a routing path may take into account a variety of variables, including the service categories that a link supports, the available bandwidth for those service categories across the link, the cost of sending data packets across a link, etc. The process of performing this determination is well known in the art, and Dijkstra algorithms are often employed.

At step 210, the originating switch A 30 establishes the connection along the first routing path. Preferably this is accomplished at step 212 based on the SVC connection scheme such that a setup message including a designated transit list (DTL) is sent to each node along the first routing path. Note that if the connection attempt along the first routing path is unsuccessful for any reason, the originating switch A 30 may repeat the comparison step using the table to determine a second, alternate routing path. Establishment of the connection can then be attempted using the second path in the same manner as establishment along the first path.

Once the connection has been established, the method preferably continues to steps 214 and 216 such that the routing tables in the system are updated. At step 214, the available bandwidth on each link along the first routing path is determined by each node along the first routing path after the connection has been established. The connection will consume some of the formerly available bandwidth for that connection type, and this step determines the bandwidth that remains available for the given connection type. At step 216, the information conveying the new available bandwidth across the links is broadcast throughout the network by each node along the first routing path. This information can then be used in future routing determinations. The details regarding how this information is relayed to the other nodes in the network is provided in the following discussion of FIGS. 3 and 5.

Figure 3:
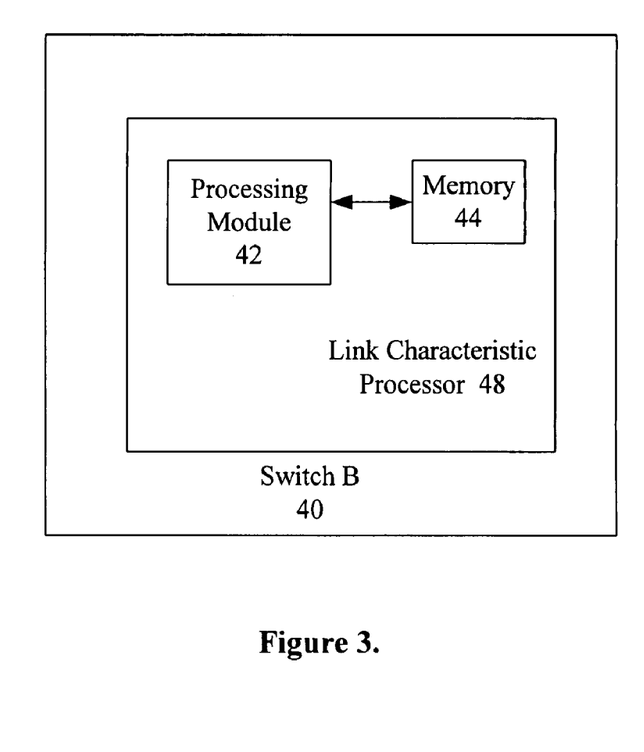
FIG. 3 illustrates a block diagram of a link characteristic processor in accordance with the present invention.

In order to be able to compile the table 36 in the connection processor 38, the information concerning the connection type characteristics and/or other forms of partitioning of the links in the network must be communicated to the originating switch A 30. FIG. 3 illustrates a switch D 40 that is capable of determining the link characteristics of links within the network. Once the connection type characteristics have been determined, they are relayed to the entities that perform routing decisions. The switch B 40 illustrated in FIG. 3 includes a link characteristic processor 48, which includes a processing module 42 and memory 44. As before, the processing module may include a variety of different processing entities, and the memory 44 may be one or more of a variety of different memory devices. A non-exhaustive list of potential processing entities and memory structures was identified with respect to the processing module 32 and memory 34 of the connection processor 38 above.

Figure 5:
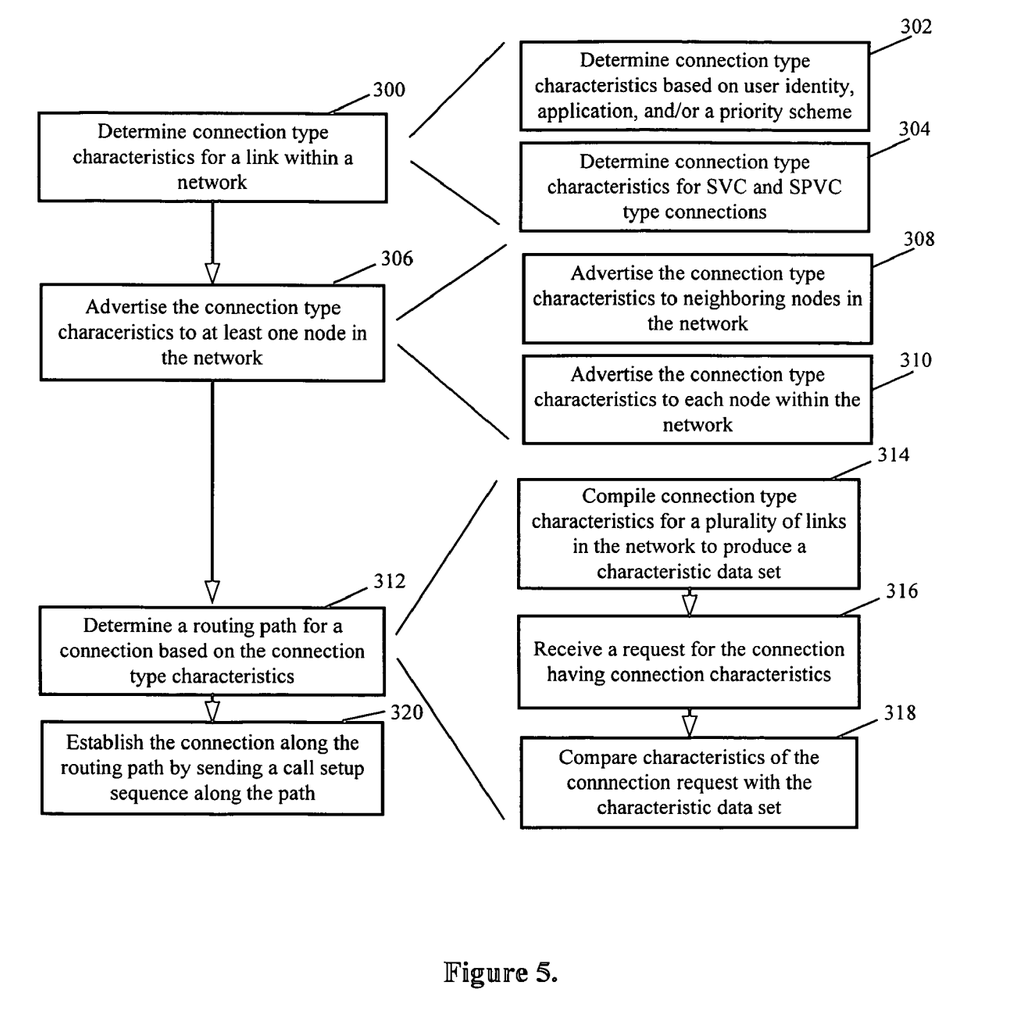
FIG. 5 illustrates a flow diagram of a method for communicating link connection type characteristics in accordance with the present invention.

The memory 44 stores programming and/or operational instructions that allow the processing module 42 to perform the method illustrated in FIG. 5. FIG. 5 illustrates a flow diagram of a method for communicating link connection type characteristics in a network. The method illustrated may be employed to determine network parameters upon initialization or startup of the network, when a connection is established (or released) that consumes (or frees) bandwidth and changes the parameters, or when a network operator changes partitioning of links within the network. The method begins at step 300, where connection type characteristics for a link within the network are determined. In the example network illustrated in FIG. 1, switch B 40 may determine the connection type characteristics for the link BC. Preferably, the determination is made for a link coupled to the switch, or localized node, performing the connection type characteristic determination.

The connection type characteristics determined at step 300 may include, as illustrated in step 302, connection type characteristics based on the source of the connection (user), application to which the connection pertains, or one of a variety of priority schemes. Similarly, at step 304, the connection type characteristics may include determining the bandwidth allocation along the link for SVC and SPVC type connections.

At step 306, the connection type characteristics determined at step 300 are advertised to at least one node in the network. Preferably, the connection type characteristics are advertised to neighboring nodes in the network. These neighboring nodes then relay this information to their neighboring nodes such that the information is disseminated throughout the network. At step 310, the connection type characteristics are advertised to each node within the network, which may include specifically targeting different nodes within the network to receive the information.

The connection type characteristics are preferably communicated using the Resource Availability Information Group (RAIG). The RAIG includes information used to attach values of topology state parameters to nodes, links, and reachable addresses. The following tables illustrate an example RAIG data set.

TABLE 1

The Resource Availability Information Group

| Offset | Size (Octets) | Name | Function/Description |
|---|---|---|---|
| 0 | 2 | Type | Type = 128 for outgoing resource availability information |
|  |  |  | Type = 129 for incoming resource availability information |
| 2 | 2 | Length |  |
| 4 | 2 | RAIG Flags | For Bit definitions see Table 5-23 RAIG Flags. |
| 6 | 2 | Reserved |  |
| 8 | 4 | Administrative Weight | default value = Default Administrative Weight, additive |
| 12 | 4 | Maximum Cell Rate | Units: cells/second |
| 16 | 4 | Available Cell Rate | Units: cells/second |
| 20 | 4 | Cell Transfer Delay | Units: microseconds |
| 24 | 4 | Cell Delay Variation | Units: microseconds |
| 28 | 2 | Cell Loss Ratio (CLP = 0) | Encoded as the negative logarithm of the value, i.e., the value n in a message indicates a CLR of $10^{-n}$ |
| 30 | 2 | Cell Loss Ratio (CLP = 0 + 1) | Encoded as the negative logarithm of the value, i.e., the value n in a message indicates a CLR of $10^{-n}$ |
|  |  | Optional GCAC related information: |  |
| 32 | 2 | Type | Type = 160 (optional GCAC parameters) |
| 34 | 2 | Length |  |
| 36 | 4 | Cell Rate Margin | Units: cells/seconds |
| 40 | 4 | Variance Factor | units of $2^{-8}$. Note: the value of 0xFFFFFFFF for Variance Factor is used to indicate infinity |

TABLE 2

RAIG Flags

Bit ID:

| | Bit 16 (MSB) | Bit 15 | Bit 14 | Bit 13 | Bit 12 | Bits 11 ... 4 | Bit 3 | Bit 2 | Bit 1 (LSB) |
|---|---|---|---|---|---|---|---|---|---|
| Meaning: | CBR | rt-VBR | nrt-VBR | ABR | UBR | Reserved | SPVCs excluded | SVCs excluded | GCAC CLP Attribute |

The RAIG flags shown in FIG. 2 are used to interpret the data included in the RAIG data set of FIG. 1 included in PNNI protocol messages. The basic RAIG configuration and operation is well known in the art, and the tables above illustrate the minor modifications that may be performed to the RAIG flag set to allow for some partitioning information to be included in the known RAIG implementation.

The upper 5 bits of the RAIG Flags indicate the service categories to which the topology state parameters contained in the RAIG apply. There is one bit for each defined service category. This allows one set of topology state parameters to apply to one or more service categories. If the topology state parameters for different service categories are not the same, multiple RAIGs, each carrying a set of topology state parameters, are advertised. All of these RAIGs are contained within a single information group describing the entity.

The lower bits 2 and 3 indicate the connection types (SVC and SPVC) to which the topology state parameters contained in the RAIG apply. There is one bit for each connection type. Note that a logic one value in the bit indicates that the connection type is not supported, whereas a logic zero indicates that the connection type is supported. This configuration allows for compatibility with current systems utilizing the prior art RAIG configuration. If a RAIG version 2 (as shown above) is received by a node that only supports RAIG version 1 (prior art version), the connection type bits in RAIG Flags are ignored by the node. Furthermore, if a service category appears in multiple RAIGs within a horizontal link, uplink, nodal state parameters, or ULIA IG, then only the first RAIG in which this service category appears, regardless of the RAIG's connection types, applies for this service category for all connection types in state-significant computations. If a RAIG version 1 is received by a node that supports RAIG version 2, the connection type bits will not be set, and the first RAIG for each service category within a horizontal link, uplink, nodal state parameters, or ULIA IG applies for this service category for all connection types in state-significant computations.

The use of bits 2 and 3 for connection type differentiation allows one set of topology state parameters to apply to one or more connection types. If the topology state parameters for different connection types are not the same, multiple RAIGs, each carrying a set of topology state parameters for the given connection type, are advertised. All of these RAIGs are contained within a single information group describing the entity. Note that in other partitioning schemes, more of the reserved bits in the flag section may be used to delineate between partitions.

Preferably, there is one set of topology state parameters for each connection type for each service category that is advertised. If there are no topology state parameters advertised for a service category, that service category is not supported by that entity for all connection types.

Those of ordinary skill in the art will recognize that by including such a RAIG version 2 in a nodal state parameters IG that this type of bandwidth partitioning is supported for PNNI Peer Groups in a PNNI hierarchical network (where Peer Groups are represented as nodes in the topology).

Once the connection type characteristics for the link have been advertised, preferably in the manner illustrated above, they can be utilized by various parties to perform a network function. These network functions can include using the connection type characteristics on a per link basis for diagnostics, expansion, network capacity planning, and the like. Preferably, the connection type characteristics are used in determining routing paths for connections, or calls, within the network.

At step 312, a routing path for a connection is determined based on the connection type characteristics. This function may be performed by the originating switch A 30, rather than performed local to the switch B 40. However, it should be noted that the originating switch A 30 may determine the connection type characteristics for its neighboring links, and as such, perform routing decisions based on connection type characteristics that it has determined.

At step 314, in order to determine routing paths for connections, the connection type characteristics for a plurality of links in the network may be compiled to produce a characteristic data set. Preferably, this includes compiling a routing table 36 utilized by the connection processor 38. The routing paths for a connection may be precomputed and stored in the routing table, or may be computed in response to a connection request based on data stored in the characteristic data set. The characteristics stored in the characteristic data set may include both the bandwidth limitations for various classes of service on each link (e.g., current PNNI version 1.0 supported parameters), as well as the different types of connection types supported on each link. Preferably, the parameters describing the different connection types supported include available bandwidth for SVC and SPVC connections. At step 316, a request for a connection having a certain set of connection characteristics is received. At step 318, the characteristics corresponding to the request are compared with the characteristic data set to determine the routing path. At step 320, the connection is established along the routing path by sending a call set up sequence along the path. This may be as was described with respect to step 212 of FIG. 4 in that a DTL is sent along the routing path.

Establishment of the connection causes a change in the link as available bandwidth is consumed. As such, the method may continue to perform the steps of detecting this change in the link that produces the altered connection type characteristics (less available bandwidth) and advertising these new characteristics. Advertising the new characteristics informs the other routing nodes in the network of the changed characteristics.

By enabling the switches within the data communications network to ascertain the connection type characteristics of neighboring links, these switches can advertise this information to other entities within the network that perform routing functions such that the routing can be accomplished in a more intelligent manner. By equipping the entities that perform routing operations with tables that store the additional connection type characteristic information, these entities are able to utilize the information to make routing and other network maintenance decisions. Preferably, the information stored within the routing table will relate directly to the likelihood of establishing a connection using the link, where the connection has a connection type that must correspond to connection types supported by the link.

Note that the added level of network information would be effective in routing connections in various connection topologies, including point to point connections, point to multi-point connections, and multi-point to point connections. Point to point connections relay information between two parties. The other topologies exchange data packets between a plurality of parties, with the data either originating from a single party (point to multi-point) or from a plurality of parties (multi-point to point). Point to multi-point connections and multi-point to point connections are analogous to tree-like topologies, where the data packets originate at either the leaves or the root of the tree.

The preceeding discussion has presented a method and apparatus for utilizing connection type characteristic information in a network to improve overall network efficiency and effectiveness. By communicating the connection type characteristics for the various links within the system to entities that are able to use this information in routing connections and for performing other functions within the network, more intelligent decisions can be made. It should be understood that the implementation of variations and modifications of the invention and its various aspects will be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for communicating link connection type characteristics in a network, comprising:
   determining connection type characteristics for a link within the network, wherein the connection type characteristics comprise partitioning of available bandwidth of the link between switched virtual connections and soft permanent virtual connections;
   advertising the connection type characteristics to at least one node in the network;
   utilizing, by the at least one node, the connection type characteristics for performing a network function, wherein utilizing further comprises selecting, by the at least one node, a routing path within the network for a connection based on the connection type characteristics;
   detecting a change in the link, wherein the change produces altered connection type characteristics; and
   advertising the altered connection type characteristics.

2. The method of claim 1, wherein the step of determining the connection type characteristics is performed by a localized node coupled to the link.

3. The method of claim 1, wherein advertising further comprises broadcasting the connection type characteristics to neighboring nodes in the network.

4. The method of claim 1, wherein advertising further comprises broadcasting the connection type characteristics to each node within the network.

5. The method of claim 1 further comprises compiling connection type characteristics for a plurality of links within the network to produce a characteristic data set, wherein selecting the routing path further comprises selecting the routing path using the characteristic data set.

6. The method of claim 5 wherein selecting the routing path further comprises comparing characteristics of a connection request with the characteristic data set, wherein the routing path is provided in response to the connection request.

7. The method of claim 6 wherein compiling further comprises compiling the connection type characteristics for the plurality of links with additional network characteristics to produce the characteristic data set.

8. The method of claim 1, wherein the connection type characteristics include information indicating likelihood of establishing the connection using the link, wherein the connection has a connection type.

9. The method of claim 8 wherein the connection type of the connection is one of a plurality of connection types, wherein the plurality of connection types includes a plurality of priority levels that determine prioritization of connections.

10. The method of claim 8 wherein the connection type of the connection is one of a plurality of connection types, wherein the plurality of connection types includes switched virtual connections and soft permanent virtual connections.

11. The method of claim 8 wherein the connection type of the connection is one of a plurality of connection types, wherein the plurality of connection types includes a plurality of user connection types, wherein bandwidth on the link is partitioned between different user connection types.

12. The method of claim 1 further comprises sending a call setup sequence to establish the connection along the routing path.

13. A method establishing a connection in a communications network, comprising:
   receiving a connection request that includes a plurality of parameters, wherein the plurality of parameters includes a receiving party, and a connection type characteristic;
   comparing the plurality of parameters with a table that stores network parameters to produce a first routing path to the receiving party, wherein the network parameters include links within the network and corresponding connection type characteristic capabilities for the links, wherein the connection type characteristic capabilities comprise partitioning of available bandwidth of the links between switched virtual connections and soft permanent virtual connections; and
   establishing the connection along the first routing path.

14. The method of claim 13 further comprises:
   when establishing the connection along the first routing path is unsuccessful:
   comparing the plurality of parameters with the table that stores network parameters to produce a second routing path to the receiving party; and
   establishing the connection along the second routing path.

15. The method of claim 13 further comprises:
   when establishing the connection along the first routing path is unsuccessful:
   comparing the plurality of parameters with the table that stores network parameters to produce at least a second routing path to the receiving party, wherein the second routing path and any additional routing paths are produced through further comparisons for subsequent rerouting attempts when connections using attempted routing paths are unsuccessful.

16. The method of claim 13, wherein connection type characteristics distinguish between switched virtual connections and soft permanent virtual connections, wherein the connection type characteristic capabilities for the links in the network indicate bandwidth allocation over each link for switched virtual connections and soft permanent virtual connections.

17. The method of claim 13, wherein connection type characteristics describe partitioning of the bandwidth across the link between different connection types.

18. The method of claim 17, wherein the different connection types to which bandwidth across the link is partitioned include a plurality of priority level connection types.

19. The method of claim 17, wherein the different connection types to which bandwidth across the link is partitioned include a plurality of user connection types.

20. The method of claim 13, wherein establishing the connection along the first routing path further comprises sending a designated transit list to each node along the first routing path.

21. A link characteristic processor comprises:
a processing module, and
memory operably coupled to the processing module, wherein the memory includes operating instruction that cause the processing module to:
determine connection type characteristics for a link within the network, wherein the connection type characteristics comprise partitioning of available bandwidth of the link between switched virtual connections and soft permanent virtual connections;
advertise the connection type characteristics to at least one node in the network, wherein the node utilizes the connection type characteristics for selecting a routing path within the network for a connection;
detect a change in the link, wherein the change produces altered connection type characteristics; and
advertise the altered connection type characteristics.

22. The link characteristic processor of claim 21, wherein the processing module is included in a localized node coupled to the link.

23. The link characteristic processor of claim 21 further comprises operating instructions that cause the processing module to:
advertise the altered connection type characteristics by broadcasting the connection type characteristics to neighboring nodes in the network.

24. The link characteristic processor of claim 21 further comprises operating instructions that cause the processing module to:
advertise the altered connection type characteristics by broadcasting the connection type characteristics to all nodes in the network.

25. The link characteristic processor of claim 21, wherein the connection type characteristics for the link include an amount of bandwidth available for switched virtual connections and soft permanent virtual connections.

26. A connection processor comprises:
a processing module; and
memory operably coupled to the processing module, wherein the memory includes operating instruction that cause the processing module to:
receive a connection request that includes a plurality of parameters, wherein the plurality of parameters includes a receiving party and a connection type characteristic;
compare the plurality of parameters with a table that stores network parameters to produce a first routing path to the receiving party, wherein the network parameters include links within the network and corresponding connection type characteristic capabilities for the links, wherein the connection type characteristic capabilities comprise partitioning of available bandwidth of the links between switched virtual connections and soft permanent virtual connections; and
establish the connection along the first routing path.

27. The connection processor of claim 26, wherein the memory further comprises operating instructions that cause the processing module to:
when establishing the connection along the first routing path is unsuccessful:
compare the plurality of parameters with the table that stores network parameters to produce a second routing path to the receiving party; and
establish the connection along the second routing path.

28. The connection processor of claim 26, wherein the memory further comprises operating instructions that cause the processing module to:
when establishing the connection along the first routing path is unsuccessful:
compare the plurality of parameters with the table that stores network parameters to produce at least a second routing path to the receiving party, wherein the second routing path and any additional routing paths are produced through further comparisons for subsequent rerouting attempts when connections using attempted routing paths are unsuccessful.

29. The connection processor of claim 26, wherein the connection type characteristics of the connection request distinguish between a switched virtual connection request and a soft permanent virtual connection request, wherein the connection type characteristic capabilities for the links in the network indicate bandwidth allocation over each link for switched virtual connections and soft permanent virtual connections.

30. The connection processor of claim 26, wherein the memory further comprises operating instructions that cause the processing module to:
establish the connection along the first routing path by sending a designated transit list to each node along the first routing path.

31. A method for communicating link connection type characteristics in a network, comprising:
determining connection type characteristics for a link within the network;
advertising the connection type characteristics to at least one node in the network;
utilizing, by the at least one node, the connection type characteristics for performing a network function, wherein utilizing further comprises selecting, by the at least one node, a routing path within the network for a connection based on the connection type characteristics;
detecting a change in the link, wherein the change produces altered connection type characteristics;
advertising the altered connection type characteristics; and
compiling connection type characteristics for a plurality of links within the network to produce a characteristic data set, wherein selecting the routing path further comprises selecting the routing path using the characteristic data set, wherein selecting the routing path further comprises comparing characteristics of a connection request with the characteristic data set, wherein the routing path is provided in response to the connection request, wherein compiling further comprises compiling the connection type characteristics for the plurality of links with additional network characteristics to produce the characteristic data set.

32. A method for communicating link connection type characteristics in a network, comprising:
   determining connection type characteristics for a link within the network, wherein the connection type characteristics comprise partitioning of available bandwidth of the link between connections selected from a group consisting of permanent connections and switched connections;
   advertising the connection type characteristics to at least one node in the network;
   utilizing, by the at least one node, the connection type characteristics for performing a network function, wherein utilizing further comprises selecting, by the at least one node, a routing path within the network for a connection based on the connection type characteristics; and
   detecting a change in the link, wherein the change produces altered connection type characteristics; and
   advertising the altered connection type characteristics.

33. The method of claim 32, wherein the step of determining the connection type characteristics is performed by a localized node coupled to the link.

34. The method of claim 32, wherein advertising further comprises broadcasting the connection type characteristics to neighboring nodes in the network.

35. The method of claim 32, wherein advertising further comprises broadcasting the connection type characteristics to each node within the network.

36. The method of claim 32 further comprises compiling connection type characteristics for a plurality of links within the network to produce a characteristic data set, wherein selecting the routing path further comprises selecting the routing path using the characteristic data set.

37. The method of claim 36 wherein selecting the routing path further comprises comparing characteristics of a connection request with the characteristic data set, wherein the routing path is provided in response to the connection request.

38. The method of claim 37 wherein compiling further comprises compiling the connection type characteristics for the plurality of links with additional network characteristics to produce the characteristic data set.

39. The method of claim 32, wherein the connection type characteristics include information indicating likelihood of establishing the connection using the link, wherein the connection has a connection type.

40. The method of claim 39 wherein the connection type of the connection is one of a plurality of connection types, wherein the plurality of connection types includes a plurality of priority levels that determine prioritization of connections.

41. The method of claim 39 wherein the connection type of the connection is one of a plurality of connection types, wherein the plurality of connection types includes a plurality of user connection types, wherein bandwidth on the link is partitioned between different user connection types.

42. The method of claim 32 further comprises sending a call setup sequence to establish the connection along the routing path.

43. The link characteristic processor of claim 32, wherein the connection type characteristics for the link include an amount of bandwidth available for switched connections and permanent connections.

44. A method establishing a connection in a communications network, comprising:
   receiving a connection request that includes a plurality of parameters, wherein the plurality of parameters includes a receiving party, and a connection type characteristic;
   comparing the plurality of parameters with a table that stores network parameters to produce a first routing path to the receiving party, wherein the network parameters include links within the network and corresponding connection type characteristic capabilities for the links, wherein the connection type characteristic capabilities comprise partitioning of available bandwidth of the links between connections selected from a group consisting of permanent connections and switched connections; and
   establishing the connection along the first routing path.

45. The method of claim 44 further comprises:
   when establishing the connection along the first routing path is unsuccessful:
   comparing the plurality of parameters with the table that stores network parameters to produce a second routing path to the receiving party; and
   establishing the connection along the second routing path.

46. The method of claim 44 further comprises:
   when establishing the connection along the first routing path is unsuccessful:
   comparing the plurality of parameters with the table that stores network parameters to produce at least a second routing path to the receiving party, wherein the second routing path and any additional routing paths are produced through further comparisons for subsequent rerouting attempts when connections using attempted routing paths are unsuccessful.

47. The method of claim 44, wherein connection type characteristics distinguish between switched connections and permanent connections, wherein the connection type characteristic capabilities for the links in the network indicate bandwidth allocation over each link for switched connections and permanent connections.

48. The method of claim 44, wherein connection type characteristics describe partitioning of the bandwidth across the link between different connection types.

49. The method of claim 48, wherein the different connection types to which bandwidth across the link is partitioned include a plurality of priority level connection types.

50. The method of claim 48, wherein the different connection types to which bandwidth across the link is partitioned include a plurality of user connection types.

51. The method of claim 44, wherein establishing the connection along the first routing path further comprises sending a designated transit list to each node along the first routing path.

52. The link characteristic processor of claim 44, wherein the connection type characteristics for the link include an amount of bandwidth available for switched connections and permanent connections.

* * * * *